United States Patent [19]
Hart

[11] Patent Number: 5,858,289
[45] Date of Patent: Jan. 12, 1999

[54] PROCESS FOR PREPARING COMPRESSED SHAPE OF CERAMIC FIBER

[75] Inventor: Charles M. Hart, New Castle, Pa.

[73] Assignee: Global Consulting, Inc., New Castle, Pa.

[21] Appl. No.: 823,991

[22] Filed: Mar. 25, 1997

Related U.S. Application Data

[60] Provisional application No. 60/039,039 Feb. 24, 1997.

[51] Int. Cl.$^6$ ..................................................... C04B 35/76
[52] U.S. Cl. ........................... 264/86; 264/640; 264/641; 264/651; 264/109
[58] Field of Search .................................. 264/640, 641, 264/651, 86, 109

[56] References Cited

U.S. PATENT DOCUMENTS

| | | | |
|---|---|---|---|
| 3,458,329 | 7/1969 | Owens et al. | 264/641 |
| 3,500,444 | 3/1970 | Hesse et al. | 219/544 |
| 3,649,406 | 3/1972 | McNish | 264/640 |
| 3,935,060 | 1/1976 | Blome et al. | 162/152 |
| 4,401,613 | 8/1983 | Abell et al. | 264/86 |
| 4,737,326 | 4/1988 | Wirth et al. | 264/56 |
| 5,120,477 | 6/1992 | Suey | 264/28 |
| 5,205,398 | 4/1993 | Hart et al. | 198/780 |
| 5,378,219 | 1/1995 | Hart et al. | 492/48 |
| 5,569,423 | 10/1996 | Belunova et al. | 264/641 |

*Primary Examiner*—James Derrington
*Attorney, Agent, or Firm*—John J. Freer

[57] ABSTRACT

A method is now disclosed for the making of compressed refractory fiber shapes, e.g., compressed ceramic fiber shapes, having a textured surface and an aggregate body. The shapes can be obtained by molding and therefore may be simple or complex. For the process, small discrete fragments of refractory fiber in accumulated form are suspended in a colloidal dispersion, such as the colloidal dispersion provided by colloidal silica. Colloidal mixtures, as of colloidal silica with colloidal alumina are also most serviceable. The fragments and the dispersion are mildly mixed so as not to thoroughly disperse the fiber fragments, but rather to form globules of the fiber in the resulting blend. The resulting material is shaped, e.g., molded under pressure, and usually dried while under pressure, which drying can be at elevated temperature. Resulting shaped objects, in addition to a textured surface and an aggregate body can have excellent thermal insulation property, and desirable flexibility as well as tensile strength.

18 Claims, No Drawings

PROCESS FOR PREPARING COMPRESSED SHAPE OF CERAMIC FIBER

This application claims the benefits of U.S. provisional application Ser. No. 60/039,039, filed Feb. 24, 1997.

FIELD OF THE INVENTION

There is disclosed an article, and a method of making an article, that is a compressed refractory fiber, generally a compressed ceramic fiber, article in shaped form having a textured surface and an aggregate type body.

BACKGROUND OF THE INVENTION

It has been known to make insulation material comprising ceramic fibers by first forming a slurry of the fibers. For example, in U.S. Pat. No. 3,935,060, it is taught to mix together ceramic fiber and a binder which is felted, then dried and fired. It is taught in this manufacture of fibrous insulation to thoroughly mix together the slurry materials. Thus, the mixture is subjected to high shear mixing to form a uniformly dispersed slurry.

It has also been known to slurry together ceramic fibers and a colloidal material such as colloidal silica for providing refractory shaped articles. Thus, in U.S. Pat. No. 4,737,326, there is disclosed bringing together ceramic fibers and colloidal silica in a process eventually producing a molded refractory article. For providing the initial dispersion, the slurry is processed under high speed mixing to provide a well mixed dispersion. The slurry can be mixed with a flocculating agent, hot molded under pressure and sintering temperature, to provide the desired shaped article.

It has also been known to prepare refractory ceramic fiber articles by a heating and freezing process. In U.S. Pat. No. 5,120,477, it has been disclosed to saturate a ceramic fiber mat with a colloidal silica suspension and then to freeze the mat. Thereafter, heating of the mat is used to remove water and the resultant product is again saturated with colloidal silica. The mat can be molded prior to freezing as well as compressed prior to freezing.

It would still be desirable to make a refractory fiber product, i.e., a compressed, shaped product, which can be an insulation product having both desirable strength and insulation properties as well as flexibility. It would also be worthwhile to provide such a product without resorting to special or expensive processing techniques, e.g., freezing and heating, or high speed mixing of slurries. It would be further desirable if such product could have an appealing, textured surface, and an aggregate type body.

SUMMARY OF THE INVENTION

There is now disclosed a compressed refractory fiber product, generally a ceramic fiber product, having a desirable textured surface and an aggregate body. The product is a compressed product that can be shaped or molded into simple or complex shapes. The processing is free from any high speed mixing or freezing steps. The resulting material has excellent thermal insulation property as well as desirable tensile strength. Furthermore, the product is non-brittle and has sufficient flexibility to be easily applied in full surface contact to curved, e.g., bowed, surfaces. Moreover, the product can be made to have a sufficiently soft surface so as to readily accommodate working, such as machining, of the surface.

In one aspect, the invention is directed to the method of making a compressed shape of at least substantially ceramic fiber, which method comprises:

providing small, discrete fragments of said ceramic fiber that is in accumulated form;

suspending said discrete fragments of said ceramic fiber into a colloidal material containing inorganic substituent in liquid medium;

mildly mixing said suspended ceramic fiber fragments in said colloidal dispersion without thoroughly dispersing said ceramic fiber in said liquid medium, said mixing reducing said fragments to more finely-divided smaller globules, thereby establishing a mixed blend of said inorganic substituent plus ceramic fiber smaller globules in liquid medium;

shaping said resulting mixed blend into a composition in shaped form; and compressing said shaped form composition.

In another aspect, the invention is directed to a compressed, at least substantially ceramic fiber product having a non-smooth, textured surface, and an aggregate type body, which product is compressed from a mixed blend in shaped form, of a colloidal material of inorganic substituent in liquid medium containing accumulated form ceramic fiber fragments in globule form, which blend is compressed at a pressure within the range of from about 20 to about 600 pounds per square inch and which product has a density within the range of from about 25 to about 100 pounds per cubic foot.

In a still further aspect, the invention is directed to the foregoing method, utilizing a refractory fiber useful in ceramic applications, including natural or synthetic fiber, as well as their mixtures. The invention is yet further directed to the shaped and compressed refractory fiber product of this method.

DESCRIPTION OF THE PREFERRED EMBODIMENTS

For the refractory fiber useful in ceramic applications, which is utilized herein, and which may often be referred to simply as the "refractory fiber", there will generally be used some ceramic fiber, e.g., from about 20 weight percent, but more usually greater than about 50 weight percent, to all, of ceramic fiber. However, it is contemplated that for such refractory fiber useful in ceramic applications there may be simply used other refractory fibers, which can be synthetic or natural mineral fiber, e.g., synthetic fibers such as glass fiber or carbon fiber, or natural mineral fibers such as mineral wool, including mineral wool with additives, or sepiolite, or wallastonite, or fiber mixtures including these natural mineral fibers. However, since the refractory fiber useful in ceramic applications will most always be some, to all, of ceramic fiber, reference herein for convenience may be made simply to ceramic fiber.

The ceramic fiber may be other than a silica-containing fiber, as represented by an alumina fiber or fiber of boron compound material, e.g., fibers of boron oxide, boron carbide or boron nitride, it is preferred for economy that the ceramic fiber be a silica-containing fiber. The silica-containing fiber may simply be silica fiber, although usually the silica is present with one or more of alumina, zirconia, chromia, or titania. Such silica-containing fibers are also meant to include fibers from silicon nitride, silicon carbide, calcium-aluminum silicate and the like.

It will be understood that the ceramic fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt. Commercial manufacture also includes sol-gel processing, e.g., for high alumina fibers. As the word is used herein, "shot" refers to the non-fibrous, and usually chunky, ceramic particles that are found in accumulated ceramic fiber, e.g., ceramic fiber blanket. Although serviceable fiber can contain shot, the ceramic fiber used herein may also be processed to have a reduced shot content, e.g., be virtually shot-free. A particularly serviceable ceramic fiber for use herein has an $SiO_2$ content of 54 weight percent, an $Al_2O_3$ content of 43.5 weight percent, an $Fe_2O_3$ content of 1.5 weight percent, and one weight percent balance of residual oxides.

For the refractory fiber, such as for ceramic fibers as they are produced, it will be typical that they can be accumulated together. Such may simply be by pressing, such as of freshly made loose fiber, into a container, e.g., a bag, for storage or shipment. This usually pressed together fiber, which can be referred to as "bulk" fiber, is in contrast to simply loose fiber which has no accumulated form. This bulk fiber can have sufficient structure so as to be difficult to pull apart into loose fiber. Accumulated fiber may also be fiber accumulated into mats. The mats may have a density on the order of from about 2 to about 8 pounds per cubic foot. These mats, often by further consolidation, may be made into blankets that will have typically a density on the order of from about 4 to 10 pounds per cubic foot for ceramic fiber. As bulk fiber, or as mats or blankets, the refractory fiber is simply referred to herein for convenience as being in "accumulated" form.

The individual fibers in accumulated form may be of varying lengths. All fibers will typically have a length of at least about 0.5 inch, with long fibers usually having length within the range of from about 8 inches up to a length of about 10 inches. A more typical fiber mixture for fibers of varying lengths has some individual short fibers at least about 1 to 4 inches long, in mixture with long fibers.

The accumulated fiber may then be used to provide discrete refractory fiber fragments. Where this fiber is otherwise utilized, e.g., as in making insulating rollers, residual or scrap fiber can be generated. For example, blanket or mat fiber can be stamped or cut into disc shape and bundles of these discs can be formed into such insulating rollers. The center and outer sections of the discs provide useful scrap fiber material for forming discrete fragments. The discs themselves may be suitable fragment size. More typically, the discs are manually torn apart into discrete fragments of serviceable size.

The fragments are typically chunky-bodied and have anisotropic shape. Usually, in the sizing or shredding to produce the fragments, they will have a size in a longest dimension of not greater than about three inches. More particularly, they have a size in the longest dimension of about one inch to about two inches. While they are prepared, as from the discarded center section of a disc, they may have a thickness on the order from about ⅛ inch to about 2 inches and their longest dimension will be other than their thickness.

The fragments are then suspended in a composition, which can be referred to herein as a "liquid composition" but is, usually referred to herein as a "colloidal material", or may be referred to as a "colloidal material of inorganic substituent in liquid medium." Such colloidal material can be represented by colloidal silica, but can include other materials such as colloidal alumina, colloidal zirconia, colloidal titania, or similar materials. The liquid medium may be an aqueous medium, as in a suspension of colloidal silica, although the use of media other than an aqueous medium is contemplated. Thus the use of colloidal materials other than aqueous suspensions is likewise contemplated. However, for convenience, reference herein to the liquid medium will usually be made to "water" or "aqueous medium".

Usually, these colloidal materials will contain from about 20 weight percent to about 50 weight percent, or more, of colloidal solids. They also can have solid particle sizes on the order of from about 5 nanometers to about 100 nanometers. Generally, the liquid composition in which the fiber fragments are suspended will include colloidal silica such as a LUDOX™ colloidal silica dispersion manufactured by E. I. DuPont de Nemours and Company or NYACOL™ colloidal dispersion available from Wesbond Corporation. The colloidal material can include a mixture of colloidal silica and colloidal alumina. It is to be understood that where a colloidal material such as colloidal silica is to be used, and particularly where commercial compositions are employed, such may contain additives.

Generally, although use of lesser amounts are contemplated, the liquid composition will be used in an amount to provide from about 40 weight percent up to about 90 weight percent or more, and preferably about 50 to about 80 weight percent, of liquid composition residue, after drying, in the total weight of the final product. These weight percents are generally absent any additives in the colloidal material, and do not include any additional substituents, e.g., fillers or the like, that may be added to the liquid composition. For this material, the ceramic fiber can contribute all of the about 10 to about 60 weight percent balance, again on a dry basis, of the final product, and again exclusive of additional substituents such as additives and fillers or the like.

The discrete fragments of refractory fiber are then brought together with the liquid composition in any manner which may be useful for such purpose. Typically, the liquid composition will be present in a container and the refractory fiber fragments will be added to the liquid composition, thereby becoming suspended. During the admixing of the fragments to the liquid composition, the liquid composition may be mildly agitated. Other additional substituents, e.g., fillers, can be added at this time. As mixing proceeds, the fragments will become immersed in the liquid composition and will slowly be reduced in size. It is advantageous that this mild mixing proceed at a rate of from about 20 to about 100 revolutions per minute. A stirring speed of less than about 20 revolutions per minute can be uneconomical for efficiently providing a well mixed blend. On the other hand, mixing at a rate greater than about 100 revolutions per minute may cause deleterious shearing of the refractory fiber fragments leading to a dispersion of fibers, rather than retention of discrete globules of refractory fiber fragments in the finally stirred product. The mixing can be generally continued for a time of from about two minutes up to about 15 minutes, or even longer, e.g., 20 to 30 minutes. A mixing time of less than about two minutes can be insufficient to provide globular formation from the suspended refractory fiber fragments. On the other hand, a mixing time of greater than about 20 to 30 minutes can be uneconomical. Preferably, the fiber fragments and liquid medium will be mixed together at a rate of from about 40 to about 80 revolutions per minute for a time of from about 5 to about 15 minutes.

As mentioned hereinabove, a mixture of colloidal silica and colloidal alumina may be used in forming the mixed blend. Often where such colloidal mixture is used with accumulated refractory fiber, soaking of the colloidal mixture into the fiber is unsatisfactory. However, with the discrete fiber fragments used in the present invention, such soaking of the mixture into the fiber is readily achieved. Thus, when desired, the product can be tailored for high temperature use, and yet the product will achieve the other worthwhile characteristics associated therewith.

The mixed blend containing the refractory fiber globules can be shaped, e.g., molded, by usually pouring the material into a container such as a die box or a mold. Such a container can be perforated and preferably will be perforated at the top, although it is contemplated that other elements of the mold may be perforated. When pressure is initiated, as by application of a perforated top to a mold and pressing of the top down onto the mold, dewatering of the mixed blend can be initiated. The compression on the blend is preferably applied mechanically, for economy, such as by a compression punch or by screw application, although other means of applying pressure, such as hydraulic means, can be useful.

Compression will be applied at a pressure within the range of from about 20 to about 600 pounds per square inch. A compression of less than about 20 pounds per square inch will be insufficient for providing a final product having desirable product characteristics. On the other hand, an applied pressure of greater than about 600 pounds per square inch can be uneconomical, merely providing a more dense product with more thermal conductivity without appreciably extending the desirable enhancement of other physical characteristics of the product. It is advantageous for efficient production of product to use drying while the mixed blend is present in the die or mold. Drying may be initiated at an early stage, even as the mixed blend is being introduced to the mold or die. Usually, however, the die or mold will be closed, as by application of a porous top, and pressure applied, and then drying will be initiated.

Drying can be undertaken by heat application. For example, where water is the liquid medium of the mixed blend, drying can generally proceed at a temperature of from about 100° F. to about 500° F. Drying may be conducted advantageously at an elevated temperature, which can be at least above about the boiling point of the liquid medium of the mixed blend. Preferably, such drying will proceed at a temperature well above the boiling point of the liquid medium. Thus, again where water is the liquid medium, the drying is preferably conducted at a temperature within the range from about 300° F. to about 400° F.

Generally, the shaping of the mixed blend, including the dewatering as well as the application of pressure and heat application, will continue for a time sufficient to provide a dry final product. Although such drying time can be dependent upon the mold size, heat application and the like, usually a drying time of from about 12 to about 36 hours is sufficient. The resulting product will advantageously have a density within the range from about 25 to about 100 pounds per cubic foot. A density of less than about 25 pounds per cubic foot can be insufficient for desirable product strength, while a density of above about 100 pounds per cubic foot can be inefficient for providing any demonstrably desirable change in product characteristics, such as substantially reduced thermal conductivity. It is usual that the density of the product will be determined, not just by the selection of the density of the initial refractory fiber fragments, or by such fragments and any fillers used in making the product, but also by the amount of mold compression. Because of these considerations, the product density may be expressed on a dry fiber basis for the product. For example, where the initial refractory fiber fragments are of six pound blanket, i.e., have a density of six pounds per cubic foot, and the mold compression will be in an amount sufficient to compress the fiber at a ratio of 3:1, the density of the refractory fiber in the final product will be 18 pounds per cubic foot. Similarly, for six pound blanket and a relevant mold compression of 4:1, the density of the refractory fiber in the final product, on a dry fiber basis, will be 24 pounds per cubic foot. The balance of the density for the final product is then contributed by substituents such as the solids residue of the colloidal material and additives such as fillers, if used.

Following removal from the mold, the product may be immediately ready for use or it might proceed through further processing, such as shaping, which may be undertaken such as by machining. The product can be tailored, e.g., as a less dense product, to have a soft surface that is particularly readily susceptible to machining. Thus, the product can contain depressions or grooves or the like provided by machining. It might also be cut into desired sizes smaller than the molded product. The product will have a textured surface, i.e., showing some of the aggregate texture. The surface will neither appear smooth visually, nor to the touch. However, the surface will be free from deleterious voids which might detract from the tensile strength of the product. The product will also have an aggregate body, which may also be referred to herein as an "aggregate type" body. By this it is meant that the product will not have a visual appearance of uniformity, but rather of fiber globules aggregated together. This structure for the product will be continuous throughout the entire product, e.g., at the subsurface as well as the surface.

It will be understood that the original refractory fiber fragments may include additional substituents other than refractory fiber. Such materials could include lubricants as well as binders. Binders may be represented by starch, latex materials and cellulosic substituents. Lubricants may be applied as from soap dispersions. Such substituents, e.g., lubricants, are typically present in minor amount. However, particularly where material such as binders have been purposely added, they may provide more than a minor amount, e.g., on the order of five to 10 weight percent of the fragment. Many of these substituents may be removed during the drying of the molded product during molding and shaping. However, residues from binders, such as from clay binders, can be retained. Other additional substituents may be introduced into the product, such as additives that may be present in the colloidal material. Such additives, including polymeric agents as represented by acrylic polymer, may provide some residue in the product, usually depending on the drying time and temperature during the molding and shaping operation. However, even when present, they will usually be present in only very minor amount, e.g., on the order of less than 5 weight percent of the product and often on the order of less than 0.5 weight percent of the product.

In addition to the foregoing, some other additional substituents, usually referred to herein simply as "fillers", may be purposefully added materials. Such can, for example, be added to the colloidal material or be blended in during the mixing of the refractory fiber fragments with such material. These purposely added additional substituents can be binders such as clay or inorganic materials, some of which may be fibrous in nature, e.g., fiberglass as an additive, as well as organic constituents, which also may be fibrous in nature, such as carbon fiber as an additive. Such additional materials can further include substituents such as talc, gypsum, portland cement, bentonite, kaolin, quartz, mica and pyrophyllite.

It will be understood that if six pound bulk fiber were compressed slightly above a ratio of 3:1, so as to provide approximately 20 pounds per cubic foot of compressed fiber, that such fiber could still be infiltrated with colloidal material. This has been disclosed, for example, in U.S. Pat. No. 5,205,398. Thus, the density of the final product, as where a representative refractory fiber plus colloidal material is considered, will not necessarily be the additive densities of the solids contributed by the refractory fiber fragments plus the solids residue from colloidal material. For example, the aforementioned six pound blanket molded at a compression to provide fiber density in the product at approximately 20 pounds per cubic foot, basis dry fiber, and initially containing colloidal silica solids in the mixed blend, used to make the product, at a weight ratio above 2:1 of colloidal silica solids to refractory fiber, can be expected to not have a final product density above 60 pounds per cubic foot. Rather, as noted hereinbelow, in connection with Example 1, this product can be expected to have a product density of below about 60 pounds per cubic foot.

The fiber product will be a dense, impact resistant and thermally stable ceramic material of attractive surface texture. Representative such material can have a modulus of rupture on the order of 400 pounds per square inch (psi) and where an aluminum silicate fiber has been used with a colloidal silica liquid material, the product can withstand a maximum surface temperature up to about 2,600° F. Moreover, the final product can have a very desirably low thermal conductivity. For example, at externally applied temperatures approaching 1,000° F., the product can have a thermal conductivity within the range from about 2 to about 5 BTU-inch per square foot per hour per °F. per watt per meter kelvin ($BTU\text{-}in/ft^2/Hr/°F./W/mK$). It can also typically have a modulus of rupture within the range of from about 400 pounds per square inch (psi) to about 800 psi. Modulus of rupture can be determined by the three point bend system, which may also be referred to as the "3×break ×span system".

EXAMPLE 1

A commercial ceramic fiber composed of 56 percent alumina and a balance essentially silica, is consolidated into blanket form. The resulting consolidated fiber is 6-pound blanket having a thickness of one inch. This blanket is used to prepare discs by stamping from the blanket. The scrap and centers from the stampings are hand shredded into small, discrete ceramic fiber fragments. All fragments have a size in their longest dimension of less than about 3 inches. The fragments have anisotropic shape and are generally chunky-bodied. A representative fragment measures 2 inches×2 inches×1 inch.

Into a container there is provided 6 pounds of colloidal silica (Wesbond 9950, Wesbond Corporation) having a solids content of 50 weight percent. Into the colloidal silica there is suspended one pound of the shredded, chunky-bodied scrap ceramic fiber. This provides a material of sufficient colloidal silica solids and ceramic fiber solids to provide, in the final product, about a 2:1 weight ratio of colloidal material solids to ceramic fiber. Using a wooden paddle and hand stirring, the suspended scrap ceramic fiber is slowly stirred for a time of about 10 minutes. By visual inspection, the chunky-bodied scraps of ceramic fiber can be seen to have been mixed into more finely-divided globules. However, the mixing stops short of achieving a uniform, fine dispersion of ceramic fiber particulates. A representative globule has a dimension of about 1/8 inch.

The resulting dispersion is poured into an open-top mold that measures 4 feet wide by 8 feet long by 6 inches deep. A top having small holes is applied and is compressed down onto the mold by screw-applied compression to achieve a fiber compression, basis dry fiber, of 20 pounds per cubic foot. After a molding time of 24 hours under this compression and a temperature of 350° F., the top is released and removed and the solid molded product, white in color, is removed from the mold. It has a strong, ceramic feel, as well as appearance, having a void-free body and a surface that exhibits some texture owing to the use of the ceramic fiber fragments. The product has a density of 58 pounds per cubic foot made up from 20 pounds of ceramic fiber and 38 pounds of colloidal silica solids residue. It also has a desirably low thermal conductivity of 1.91 $BTU\text{-}in/ft^2/Hr/°F./watt/meter$ kelvin at 970° F. and a modulus of rupture of 400 pounds per square inch as determined by the three point bend system and using a Model No. TM10 machine manufactured by United Testing Service.

COMPARATIVE EXAMPLE 1A

The format of Example 1 is followed, but without application of pressure in the mold. A container is used with colloidal silica and ceramic filter fragments and gentle hand stirring with a wooden paddle is employed. The resulting dispersion is shaped and molded in the manner of Example 1, but no pressure is utilized in the molding. This product is thus a comparative product.

On removal from the mold, the product could be seen by visual inspection to have a body and a surface full of voids. Moreover, the product had little tensile strength, being readily broken by manually pulling the product apart.

COMPARATIVE EXAMPLE 1B

The format of Example 1 is followed. Again, a container with colloidal silica is used. However, rapid, extended high speed mixing is used employing a high shear mixer for 20 minutes. There results a uniform, fine dispersion of both the colloidal silica and the ceramic fiber. This product is thus a comparative product.

The resulting dispersion is shaped and molded in the manner of Example 1. On removal from the mold, the product was brittle and had virtually no flexural capability.

I claim:

1. The method of making a compressed shape of at least substantially ceramic fiber, which method comprises:

providing small, discrete fragments of said ceramic fiber that is in accumulated form;

suspending said discrete fragments of said ceramic fiber into a colloidal material containing inorganic substituent in liquid medium;

mildly mixing said suspended ceramic fiber fragments in said colloidal dispersion without thoroughly dispersing said ceramic fiber in said liquid medium, at a rate of from about 20 to about 100 revolutions per minute for a time of from about 2 minutes to about 30 minutes, said mixing reducing said fragments to more finely-divided smaller globules, thereby establishing a mixed blend of said inorganic substituent plus ceramic fiber smaller globules in liquid medium;

shaping said resulting mixed blend into a composition in shaped form; and compressing said shaped form composition.

2. The method of claim 1, wherein there are provided small fragments of accumulated form ceramic fiber, which fragments have a density within the range from about 2 to about 10 pounds per cubic foot.

3. The method of claim 2, wherein said accumulated form ceramic fiber fragments are in blanket form and have a density within the range from about 4 to about 8 pounds per cubic foot.

4. The method of claim 1, wherein there are provided chunky-bodied, ceramic fiber fragments of anisotropic shape and said fragments have a size in a longest dimension of not greater than about 3 inches.

5. The method of claim 1, wherein said small fragments of ceramic fiber are suspended in a colloidal material of one or more of colloidal silica, colloidal alumina, colloidal zirconia, colloidal titania and mixtures thereof.

6. The method of claim 1, wherein said fragments of ceramic fiber are immersed in said colloidal dispersion.

7. The method of claim 1, wherein said suspended fragments are gently mixed and reduced to globules having a size on the order of about 1/8 inch in longest dimension.

8. The method of claim 1, wherein said resulting mixed blend is shaped by molding.

9. The method of claim 1, wherein said shaped form composition is compressed at a pressure within the range of from about 20 to about 600 pounds per square inch and has a density within the range of from about 25 to about 100 pounds per cubic foot.

10. The method of claim 1, wherein said mixed blend is compressed and dried.

11. The method of claim 10 wherein said mixed blend is compressed and dried for a time of from about 8 hours to about 36 hours at a temperature of from about 100° F. to about 500° F.

12. The method of claim 1, wherein said shaped form composition is compressed while removing liquid from said mixed blend.

13. The method of claim 1, wherein said mixed blend is compressed by means of screw compression.

14. The method of claim 11, wherein said compressed and dried composition comprises from about 40 to about 90 weight percent of colloidal solids residue and from about 10 to about 60 weight percent of ceramic fiber.

15. The method of claim 1 wherein additional substituents are mixed with said ceramic fiber fragments in said dispersion.

16. The method of making a compressed shape containing a refractory fiber useful in ceramic applications, which method comprises:

provides small, discrete fragments of said refractory fiber that is in accumulated form;

suspending said discrete fragments of said refractory fiber into a colloidal material containing inorganic substituent in liquid medium;

mildly mixing said suspended refractory fiber fragments in said colloidal dispersion without thoroughly dispersing said fiber in said liquid medium, at a rate of from about 20 to about 100 revolutions per minute for a time of from about 2 minutes to about 30 minutes, said mixing reducing said fragments to more finely-divided smaller globules, thereby establishing a mixed blend of said inorganic substituent plus refractory fiber smaller globules in liquid medium;

shaping said resulting mixed blend into a composition in shaped form; and compressing said shaped form composition.

17. The method of claim 16, wherein there are provided small fragments of accumulated form refractory fiber, which fiber comprises a synthetic fiber selected from the group consisting of glass fiber and carbon fiber, or a ceramic fiber selected from the group consisting of silica-containing ceramic fiber, boron-containing ceramic fiber, alumina-containing ceramic fiber, zirconia-containing ceramic fiber, chromia-containing ceramic fiber, titania-containing ceramic fiber, as well as mixtures thereof.

18. The method of claim 16, wherein there are provided small fragments of accumulated form refractory fiber, which fiber comprises a natural fiber selected from the group consisting of mineral wool, sepiolite, wallastonite, as well as mixtures thereof.

* * * * *